United States Patent Office 3,454,327
Patented July 8, 1969

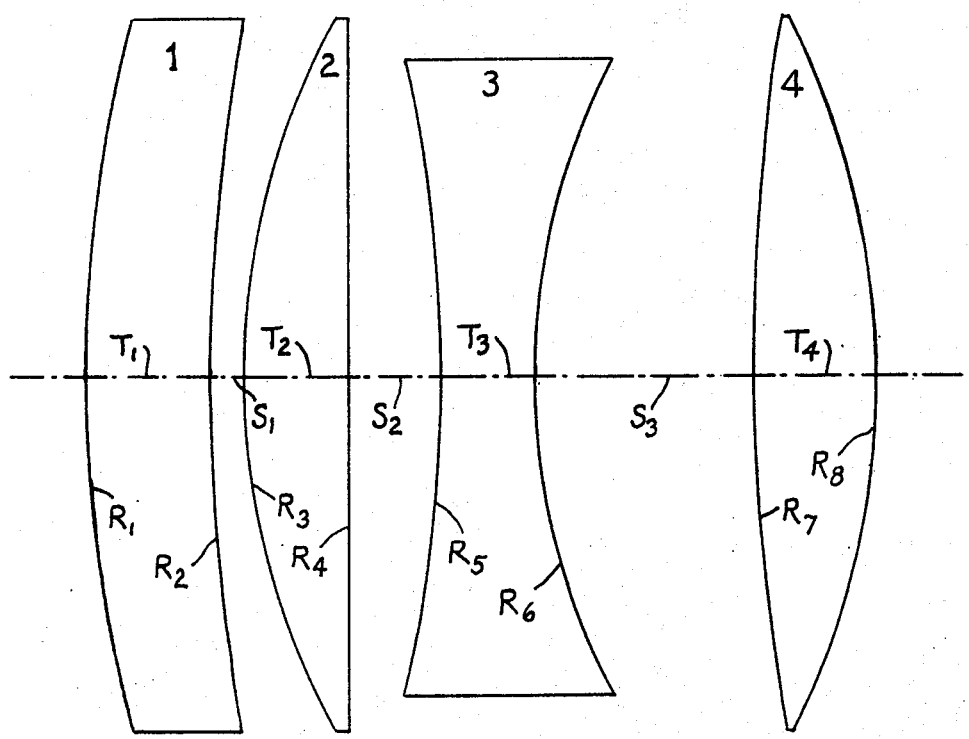

3,454,327
HIGH APERTURE RECORDING LENS SYSTEM HAVING FOUR LENS ELEMENTS
Eugene Turula, Geraldine B. Lynch, and David C. Gilkeson, Irondequoit, N.Y., assignors to Minnesota Mining and Manufacturing Company, St. Paul, Minn., a corporation of Delaware
Filed Mar. 22, 1966, Ser. No. 536,370
Int. Cl. G02b 9/34
U.S. Cl. 350—223                                  4 Claims

ABSTRACT OF THE DISCLOSURE

A lens system of four elements, particularly suitable for recording purposes at a relatively high aperture, and satisfactory for use in the P–11 phosphor wavelength spectral region. The first, second, and fourth elements have positive power, and the third element is negative. The lens covers a total field angle of approximately 45 degrees at a magnification of 1.0× and a total field angle of approximately 37.5 degrees at a magnification of 0.7×.

---

The present invention relates to a lens system, especially but not exclusively suitable for a recording lens, and more particularly to one which is especially suitable for use in recording the image on a cathode ray tube (such a tube being hereafter sometimes referred to for brevity as CRT).

An object of the invention is the provision of a simplified lens suitable for the above mentioned purposes as well as others, having a functional performance equivalent to that of more complicated and expensive lens systems.

Another object is the provision of such a lens which is of simplified design, capable of being manufactured relatively inexpensively, and yet giving high relative illumination in the image plane.

Still another object is the provision of such a lens which may be used at a relative aperture as high as f/1.9, and which may be used at various magnifications, and which is satisfactory for use in the P–11 phosphor wavelength spectral region.

A further object is the provision of an improved lens having some or all of the above mentioned characteristics, which is in the form of a modified triplet having four elements, the first two elements having positive converging power, the third element having negative diverging power, and the fourth element having positive converging power. This may be regarded for convenience as a triplet modified by using two positive elements in front of the negative element, instead of the single positive element usually found in front of the negative element in a conventional triplet.

A still further object is the provision of a lens satisfying some or all of the above mentioned objects and which, in addition, is so designed as to minimize loss of light by absorption and reflection, and which has a high percentage of light transmission in the P–11 phosphor wavelength spectral region.

A further object is the provision of a lens accomplishing some or all of the above mentioned objects and also being useful over a range of magnifications from 1.0× with a total field angle of approximately 45 degrees, to a magnification of 0.7× with a total field angle of approximately 37.5 degrees, with distortion corrected so as not to exceed 0.4% at the maximum field angle for any specified magnification within the above mentioned range.

These and other desirable objects may be attained in the manner disclosed as an illustrative embodiment of the invention in the following description and in the accompanying drawings forming a part hereof, in which the single figure is a diagram of a lens according to a preferred embodiment of the invention.

In the past it has been customary to use, for CRT recording purposes, a lens of a complex type, more specifically a lens of the Gaussian type, having six or more elements, at least two of which elements are of large axial thickness. As compared with such lenses, the lens of the present invention has fewer elements, therefore having less light loss by absorption and reflection, and being less expensive to manufacture. Also, all elements of the present lens are relatively thin, no element having an axial thickness in excess of 0.18 times the diameter of the element, so that the present lens assembly is relatively light in weight, in comparison to prior lens systems which include thick elements. The lens of the present invention works at the high relative aperture of f/1.9, and provides greatly improved relative illumination in the image plane.

Relative illumination is defined in MIL–STD–150A as being the ratio of the illuminance at the focal plane, for off-axis field positions, to the illuminance for the center of the field. The relative illumination is specified as a ratio (expressed as a percent) of the illuminance at an off-axis position to the illuminance at the axis. Reduction in illuminance at the off-axis points is caused by several factors, two of which are the cosine variations and vignetting.

By way of comparison, it has been computed that the lens of the present invention, when used at a relative aperture of f/1.9 and a total field angle of 43 degrees, with 0.9× magnification and with an entrance window whose free aperture is approximately one-half of the equivalent focal length of the objective, has a loss of illuminance on the screen for an image point 21.5 degrees off-axis, of 42 percent, due to vignetting. This results in a center-to-corner illuminance on the screen of 58 percent. Then in addition to this loss by vignetting, the cosine variation for an angle of 21.5 degrees causes a further reduction in the illuminance of 25 percent. Therefore the relative illumination produced by the present lens at the edge of a field which is 21.5 degrees off-axis, so far as vignetting losses and cosine effect are concerned, is 43.5 percent. This compares very favorably indeed with the relative illumination produced by most standard Gaussian objectives, used under comparable conditions of relative aperture, field angle, magnification, and entrance window diameter. Under such comparable conditions, most standard Gaussian objectives yield a relative illumination in the image plane of approximately 12 percent or less. When comparing this to the 43.5 percent relative illumination obtained under comparable conditions by the lens of the present invention, it is seen that the present lens has a distinct advantage and greatly reduces the fall-off in illumination at the edge of the field.

The present lens is particularly suitable for CRT recording, not only because of the high relative illumination and other desirable characteristics above mentioned, but also because the refractive indices of the glasses used in the present lens are so chosen as to yield a high percentage of light transmission in the P–11 phosphor wavelength spectral region. In addition, the use of relatively few elements (as compared with the more complex lenses customarily used for CRT recording in the past) minimizes the loss of light by absorption and reflection. Also, in the present lens, spherical aberration is well corrected for the high relative aperture of the system. Chromatic and monochromatic aberrations have been minimized by careful choice of the dispersive properties of the glasses chosen.

In the accompanying diagram as well as in the specification and claims, the individual lens elements are numbered from 1 to 4 consecutively from front to rear. The radii of curvature R of the lens surfaces, the axial thicknesses T of the lens elements, and the axial air spacings S, are all expressed in the customary manner, with the usual subscript numerals indicating the particular surface, lens thickness, or air space, numbered in sequence from front to rear. Positive and negative values of R indicate surfaces respectively convex and concave toward the front. A radius of infinity means, of course, a plane surface. The respective refractive indices, expressed with reference to the spectral D line of sodium, are indicated by N, and the dispersive indices or Abbe numbers are indicated by $\nu$, with subscripts to identify the particular lens element. The equivalent focal length of the entire objective or lens assembly may be referred to as $F_E$, and the focal length of any individual lens element is indicated by F with a numerical subscript identifying the individual lens element.

According to the invention, the lens system will produce the desirable results above mentioned and satisfy the stated objects and purposes, when the variable factors indicated in accompanying Table 1 are within the respective ranges or limits there indicated.

Table 1

$1.695F_E < F_1 < 2.075F_E$ $.790F_E < F_2 < .965F_E$ $-.440F_E < F_3 < -.540F_E$ $.725F_E < F_4 < .885F_E$ $.475F_1 < R_1 < .580F_1$ $3.150F_1 < R_2 < 3.850F_1$ $.550F_2 < R_3 < .675F_2$ $-2.265F_2 < R_4 \leqslant \infty$ $1.892F_3 < R_5 < 2.312F_3$ $-.915F_3 < R_6 < -1.120F_3$ $3.470F_4 < R_7 < 4.240F_4$ $-.645F_4 < R_8 < -.790F_4$ A specific example of a lens system whose variables fall within the limits of Table 1, and which meets all of the outlined requirements and gives excellent results, may be constructed in accordance with the data in Table 2, the various symbols therein having the meanings above explained.

TABLE 2

| Lens | $N_D$ | $\nu$ | Radii | Thicknesses | Focal lengths |
|---|---|---|---|---|---|
| 1 | 1.6170 | 55.1 | $R_1=+99.39$ | $T_1=9.05$ | $F_1=+188.49$ |
|   |        |      | $R_2=+659.95$ | $S_1=2.65$ |            |
| 2 | 1.6110 | 57.2 | $R_3=+53.63$ | $T_2=7.95$ | $F_2=+87.78$ |
|   |        |      | $R_4=\infty$ | $S_2=6.95$ |            |
| 3 | 1.6725 | 32.2 | $R_5=-102.7$ | $T_3=7.25$ | $F_3=-48.87$ |
|   |        |      | $R_6=+49.7$ | $S_3=16.17$ |            |
| 4 | 1.6110 | 57.2 | $R_7=+310.1$ | $T_4=8.60$ | $F_4=+80.47$ |
|   |        |      | $R_8=-57.82$ |            |            |

Equivalent focal length of system = $F_E$ = 100.0.

Aperture = $f/1.9$.

Field angle = 43° at 0.9× magnification 45° at 1.0× magnification, 37.5° at 0.7× magnification.

In the foregoing Table 2, all of the linear dimensions are relative rather than absolute, and are based on an equivalent focal length of 100. This is in accordance with a common form of notation frequently used and well understood in the art. Thus if the equivalent focal length of the lens system is to be 100 millimeters then the various linear dimensions given in Table 2 (radii and thicknesses and spacings) also represent millimeters. But if the equivalent focal length is expressed in any other units of measurement, the radii, thicknesses, and spacings would be in the same units of measurement.

A particularly satisfactory lens according to the present invention is one which has an equivalent focal length of 75 millimeters. All the linear dimensions thereof, expressed in millimeters, therefore would be three-quarters of the respective figures given in Table 2. In such a lens, the diameters of elements 1, 2, and 4 is 39 millimeters, and the diameter of element 3 is 35 millimeters. For a lens on the basis of $F_E=100$, the respective diameter figures would be 52 for elements 1, 2, and 4, and 46.7 for element 3. Hence the thickness of the thickest element (element 1) is not more than 0.18 of the diameter thereof, which is a characteristic mentioned above.

It is seen from the foregoing disclosure that the objects and purposes of the invention are well fulfilled. It is to be understood that the disclosure is given by way of illustrative example only, rather than by way of limitation, and that without departing from the invention, the details may be varied.

What is claimed is:

1. A lens system comprising four lens elements wherein the below mentioned characteristics of the elements and their spatial relationship to each other are substantially in the proportions indicated by the data in the following table:

| Lens | $N_D$ | $\nu$ | Radii | Thicknesses |
|---|---|---|---|---|
| 1 | 1.6170 | 55.1 | $R_1=+99.39$ | $T_1=9.05$ |
|   |        |      | $R_2=+659.95$ |           |
|   |        |      |              | $S_1=2.65$ |
| 2 | 1.6110 | 57.2 | $R_3=+53.63$ | $T_2=7.95$ |
|   |        |      | $R_4=\infty$ |           |
|   |        |      |              | $S_2=6.95$ |
| 3 | 1.6725 | 32.2 | $R_5=-102.7$ | $T_3=7.25$ |
|   |        |      | $R_6=+49.7$  |           |
|   |        |      |              | $S_3=16.17$ |
| 4 | 1.6110 | 57.2 | $R_7=+310.1$ | $T_4=8.60$ |
|   |        |      | $R_8=-57.82$ |           | wherein the refractive indices for the D line of sodium are given in the column headed $N_D$, the corresponding Abbe dispersive indices are given in the column headed $\nu$, the radii of curvature of the lens surfaces are given in the column headed radii, and the axial thicknesses T of the lens elements and the axial spaces S between successive elements are given in the column headed thicknesses, the individual thicknesses and spacings being separately numbered consecutively from fornt to rear and identified by subscript numerals, the linear dimensions of radii, thicknesses, and spacings being expressed proportionally on the basis of a lens system having an equivalent focal length of 100.

2. A lens system as defined in claim 1, wherein the system has a relative aperture of not less than substantially $f/1.9$ and a total field angle of not less than substantially 45 degrees when used at 1.0× magnification, not less than substantially 43 degrees when used at 0.9× magnification, not less than substantially 37.5 degrees when used at 0.7× magnification, and is especially suitable for use in recording the image on a cathode ray tube.

3. A lens system as defined in claim 2, wherein lens elements (1), (2), and (4) each have a diameter of approximately 52 and element (3) has a diameter of approximately 46.7 in proportion to an equivalent focal length of 100 for the entire system.

4. A lens system as defined in claim 1, wherein the lens system has an equivalent focal length of substantially 75 millimeters and the linear dimensions of radii, thicknesses, and spacings, expressed in millimeters, are each substantially three-quarters of the respective figures specified in claim 2.

References Cited

UNITED STATES PATENTS 2,767,614   10/1956   Altman _____ 350—223

JOHN K. CORBIN, *Primary Examiner.*

U.S. Cl. X.R.

178—7.85